United States Patent
Lakshmikantha et al.

(10) Patent No.: US 12,379,998 B2
(45) Date of Patent: Aug. 5, 2025

(54) MULTIPLE VIRTUAL NAMESPACES ON A SINGLE PHYSICAL NAMESPACE TO AVOID FILE SYSTEM RESTARTS AND IMPROVE AVAILABILITY

(71) Applicant: EMC IP Holding Company LLC, Hopkinton, MA (US)

(72) Inventors: Shashikanth Lakshmikantha, San Jose, CA (US); Sankalp Suhas Taralekar, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 217 days.

(21) Appl. No.: 17/376,916

(22) Filed: Jul. 15, 2021

(65) Prior Publication Data

US 2023/0025994 A1 Jan. 26, 2023

(51) Int. Cl.
*G06F 16/00* (2019.01)
*G06F 11/14* (2006.01)
*G06F 16/901* (2019.01)
*G06N 20/00* (2019.01)

(52) U.S. Cl.
CPC ...... *G06F 11/1448* (2013.01); *G06F 16/9017* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,408,298 | B1 * | 6/2002 | Van | G06F 16/10 |
| 8,478,799 | B2 * | 7/2013 | Beaverson | G06F 16/188 |
| | | | | 707/823 |
| 9,367,551 | B2 * | 6/2016 | Beaverson | G06F 16/188 |
| 9,965,483 | B2 * | 5/2018 | Beaverson | G06F 16/188 |
| 10,116,764 | B1 * | 10/2018 | Ayachit | H04L 67/1095 |
| 10,474,631 | B2 * | 11/2019 | Beaverson | G06F 16/9014 |
| 10,496,283 | B2 * | 12/2019 | Waghulde | G06F 3/0656 |
| 10,642,750 | B2 * | 5/2020 | Ritchie | G06F 13/372 |
| 10,891,264 | B2 * | 1/2021 | Wang | H04L 67/568 |
| 2009/0007161 | A1 * | 1/2009 | Sheehan | G06F 9/5005 |
| | | | | 719/331 |
| 2009/0030957 | A1 * | 1/2009 | Manjunath | G06F 16/188 |
| 2010/0088328 | A1 * | 4/2010 | Joshi | G06F 9/45558 |
| | | | | 718/1 |

(Continued)

OTHER PUBLICATIONS

KAML_A Flexible, High-Performance Key-Value SSD, Jim et al., IEEE (Year: 2017).*
Global namespace for files, Anderson et al., IEEE (Year: 2004).*

*Primary Examiner* — Jean M Corrielus
(74) *Attorney, Agent, or Firm* — Workman Nydegger

(57) ABSTRACT

One example method includes defining a physical namespace, determining a number of virtual namespaces, virtualizing the physical namespace by defining the virtual namespaces on the physical namespace, and generating a modified lookup key that is a function of a name of one of the virtual namespaces. The modified lookup key may be moved between virtual namespaces without requiring interruption of a backup or restore process, and without requiring an associated file system to be taken offline. Movement of the modified lookup key may be transparent to a user and may permit preservation of scripts that were in place prior to the move.

14 Claims, 6 Drawing Sheets

(56) References Cited

U.S. PATENT DOCUMENTS

| | | | |
|---|---|---|---|
| 2012/0124087 A1* | 5/2012 | Malan | H04L 63/1441 |
| | | | 707/E17.014 |
| 2013/0268644 A1* | 10/2013 | Hardin | G06F 16/2255 |
| | | | 709/223 |
| 2013/0290263 A1* | 10/2013 | Beaverson | G06F 16/13 |
| | | | 707/649 |
| 2016/0019233 A1* | 1/2016 | Wijayaratne | H04L 67/1095 |
| | | | 707/625 |
| 2016/0124972 A1* | 5/2016 | Jain | G06F 3/067 |
| | | | 707/673 |
| 2016/0124977 A1* | 5/2016 | Jain | H04L 9/3242 |
| | | | 707/649 |
| 2016/0283498 A1* | 9/2016 | Beaverson | G06F 16/9017 |
| 2016/0299917 A1* | 10/2016 | Koos | G06F 16/178 |
| 2016/0321294 A1* | 11/2016 | Wang | H04L 67/568 |
| 2016/0359740 A1* | 12/2016 | Parandehgheibi | H04L 43/062 |
| 2017/0039143 A1* | 2/2017 | Ritchie | G06F 16/9014 |
| 2017/0212680 A1* | 7/2017 | Waghulde | G06F 3/0616 |
| 2017/0235749 A1* | 8/2017 | Beaverson | G06F 16/13 |
| | | | 707/747 |
| 2017/0272546 A1* | 9/2017 | Vajravel | H04L 67/14 |
| 2017/0344259 A1* | 11/2017 | Freyensee | G06F 3/0632 |
| 2017/0351431 A1* | 12/2017 | Dewitt | G06F 3/0619 |
| 2017/0357663 A1* | 12/2017 | Giampaolo | G06F 16/185 |
| 2019/0042144 A1* | 2/2019 | Peterson | G06F 3/0635 |
| 2019/0227718 A1* | 7/2019 | Frolikov | G06F 12/0646 |
| 2019/0227921 A1* | 7/2019 | Frolikov | G06F 12/1408 |
| 2021/0072927 A1* | 3/2021 | Yang | G06F 9/5077 |
| 2021/0263779 A1* | 8/2021 | Haghighat | G06F 9/5061 |
| 2022/0382689 A1* | 12/2022 | Liu | G06F 16/245 |

* cited by examiner

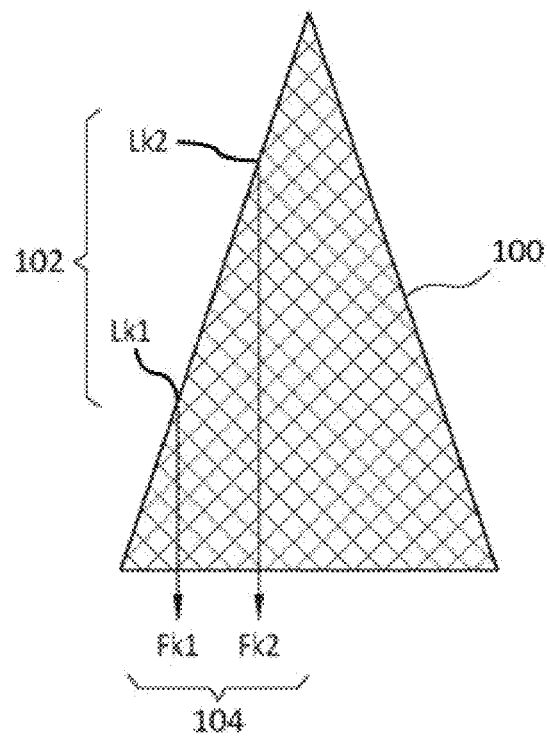
FIG. 1
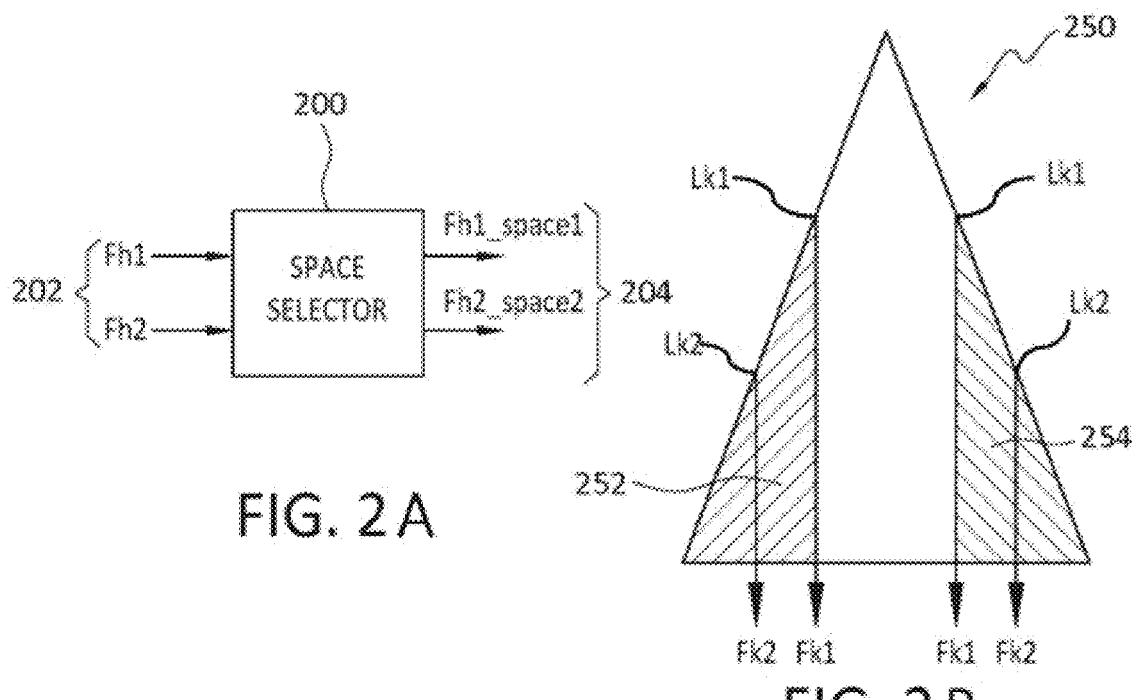
FIG. 2A
FIG. 2B

• Chmod time remains same

!!!! apollo211 YOUR DATA IS IN DANGER !!!! # time for i in $(seq 1 10000); do chmod 774 $i.txt; done real   0m41.623s user   0m3.547s sys   0m29.629s !!!! apollo211 YOUR DATA IS IN DANGER !!!! # time for i in $(seq 1 10000); do chmod 777 $i.txt; done real   0m40.562s user   0m2.556s sys   0m29.238s

FIG. 4A

• Filesys restart time that we save

!!!! apollo211 YOUR DATA IS IN DANGER !!!! # time ddsh -s fi disable
Please wait..........................
The filesystem is now disabled.

real   1m2.380s
user   0m0.046s
sys   0m0.012s

SE@apollo211## !!!! apollo211 YOUR DATA IS IN DANGER !!!! # time ddsh -s fi enable
Please wait............................
The filesystem is now enabled.
real   1m53.212s
user   0m0.046s

FIG. 4B

Logs (DUTI)

11/19 04:02:55.109 (tid 0x7fb643052460): _dm_update_node:12271 SANKALP Relocated fkey with space new fkey pid: 1073741840for mid = 1605758414, pid = 16, cid = 17 for Active context = 0x7fb5c14a7540
11/19 04:02:55.109 (tid 0x7fb643052460): dmbt_tran_log_intern:2255 mid=1605758414 rec_commit_id=4 disk_commit_id=3 dmbt_commit_id=4 rec_seqno=3 dmbt_seqno=4 commit=4
11/19 04:02:55.115 (tid 0x7fb643052460): FM fm_dml_to_attr:1272 - error = 0
11/19 04:02:55.115 (tid 0x7fb643052460): dmbt_get_entry_nolock:12336 SANKALP fkey pid: 16 cid:17
11/19 04:02:55.115 (tid 0x7fb643052460): dmbt_get_entry:12435 SANKALP Relocated fky with spacepid = 1073741840

FIG. 4C

MULTIPLE VIRTUAL NAMESPACES ON A SINGLE PHYSICAL NAMESPACE TO AVOID FILE SYSTEM RESTARTS AND IMPROVE AVAILABILITY

FIELD OF THE INVENTION

Embodiments of the present invention generally relate to definition and use of namespaces. More particularly, at least some embodiments of the invention relate to systems, hardware, software, computer-readable media, and methods for defining multiple virtual namespaces on a single physical namespace.

BACKGROUND

Namespaces are commonly employed as an environment to hold identifiers that may each uniquely identify an object, such as a file for example. In some cases, a namespace may take the form of a data structure that holds a mapping of lookup keys to full keys, where the full keys may include, as one of their components, a file handle or filename. While namespaces are generally useful, various problems have arisen in connection with their use. Such problems may arise, for example, in the context of a physical namespace such as may reside in memory.

For example, when a customer experiences some type of namespace problem, it is often that case that a customer support team may have to perform various operations to resolve the problem. Such operations may include, for example, offlining the file system one or more times, copying the old namespace to a new namespace, then deleting the old namespace and restarting the filesystem with the new namespace. These operations, while possibly effective in resolving the customer problem, introduce problems of their own.

Such problems, which may stem in part or in whole from taking the file system offline, may include disruption of backup and restore operations. As well, backup workflows, or scripts, must be changed as a result of creation of the of new namespace since those scripts must point to the new namespace in order to function properly. The following example is illustrative: Namespace_1 must be changed to Namespace_1_new; the old namespace (Namespace_1) must be deleted; and, replication relationships must be re-established, that is, the replication relationships must be removed from Namespace_1 and moved to Namespace_1_new. Performance of this process may halt operations for an indeterminate period of time. This is unacceptable both from the provider point of view, and the customer point of view.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 1 discloses aspects of an example physical namespace.

FIG. 2A discloses aspects of a selector for selecting a virtual namespace, and FIG. 2B discloses examples of sparse and non-sparse virtual namespaces.

FIGS. 4a, 4b, and 4c, disclose example experimental results associated with one or more example embodiments.

DETAILED DESCRIPTION OF SOME EXAMPLE EMBODIMENTS

Figure 3:
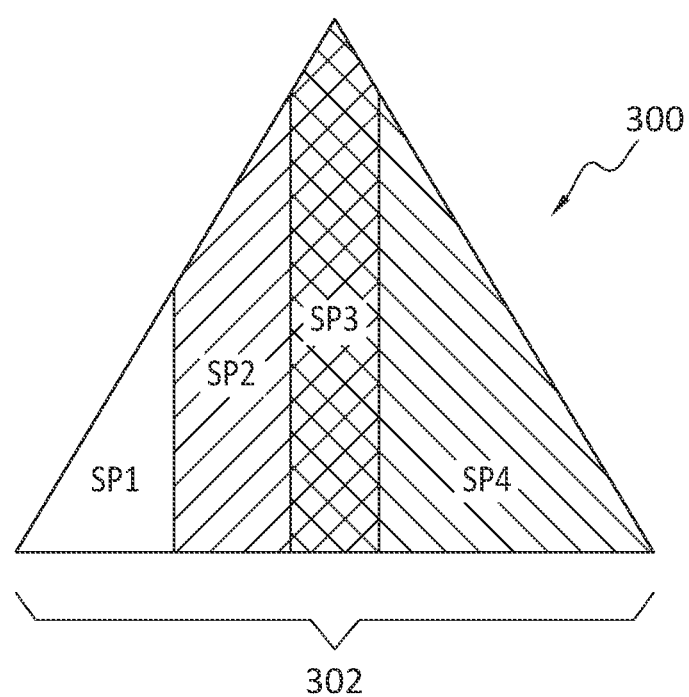
FIG. 3 discloses aspects of example virtual namespaces on a physical namespace.

Embodiments of the present invention generally relate to definition and use of namespaces. More particularly, at least some embodiments of the invention relate to systems, hardware, software, computer-readable media, and methods for defining multiple virtual namespaces on a single physical namespace. The single physical namespace may reside in memory and may, for example, define or comprise a range of addresses, on physical media, where file handles or <key, value> pairs may be stored.

In general, example embodiments of the invention may implement various functionalities, including helping to avoid file system restarts while maintaining the same support to customers, solving namespace problems such as those disclosed herein, and/or improving file system availability while making namespace modifications. As such, example embodiments may provide a namespace that retains all the correct namespace entries, may provide for exclusion of problematic namespace entries, and/or, may provide a namespace that retains the same namespace identity, that is, for example, the same Mtree name and path, so as to reduce or avoid workflow disruption.

In some example embodiments, one or more virtual namespaces may be defined and employed. The virtual namespaces may be defined on top of a single physical namespace, and new/modified virtual namespaces may be created without requiring any on-disk changes. In some embodiments, virtual namespace changes may be implemented without any adverse impact to backup or replication operations. Machine Learning (ML) and/or Artificial Intelligence (AI) models may be employed to intelligently select virtual namespaces.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one or more embodiments may operate to improve directory read performance. An embodiment may provide for improved namespace compaction. An embodiment may avoid the need to take a file system offline when namespace changes are being made. An embodiment may implement namespace changes without the need to change backup and replication scripts.

A. ASPECTS OF SOME EXAMPLE EMBODIMENTS

Directing attention now to FIG. 1, details are provided concerning various aspects of some example embodiments of the invention. In general, FIG. 1 discloses an example of a data structure 100, such as Btree for example, that comprises or stores a physical namespace. The namespace may map one or more lookup keys 102 to respective full keys 104. The file handles may be components of respective full keys. As such, the namespace at least indirectly comprises a mapping of (lookup keys, file handle). Following is a brief discussion of some terminology and relationships that may be employed in connection with one or more embodiments of the invention.

As used herein: LK refers to a Lookup Key; FK refers to a Full Key, which may include Inode data; FH refers to a File Handle that may correspond to a file, where each File Handle may be represented by a parent id (pid) and child id (cid), and the parent id may identify a directory, and the child id may identify a filename; fn=> function of; Lk1=fn (pid1, cid1) // read as: Lookup key 1 is a function of (pid1, cid1); Lk2=fn(pid1, cid2); and, FH=fn(namespace id, snapshot id, pid, cid). Example lookup key and full key relationships are indicated in FIG. 1. For example, the data structure 100 may be traversed to find a full key that corresponds to a lookup key. To illustrate, given the lookup key Lk1, the data structure 100 may be traversed to find the full key Fk1 that corresponds to the lookup key Lk1.

As noted, the data structure 100 may be considered as forming, or comprising, a single physical name space. In this configuration, all of the lookup keys are thus elements of one single namespace. In general, some example embodiments of the invention may operate to virtualize a single physical namespace, such as that shown in FIG. 1, and create multiple virtual namespaces on that single physical namespace. In some embodiments, the creation and use of multiple virtual namespaces may be implemented without necessitating any ondisk changes.

With reference next to FIGS. 2A and 2B, details are provided concerning the creation of one or more virtual namespaces on a single physical namespace. In some embodiments, virtual namespaces may be created by using bits from the pid of a file handle. In one particular embodiment, the number of virtual namespaces may be a function of the number of pid bits. Thus, if the relation between n pid bits and virtual namespaces is 2n, for example, and n=2, then the number of virtual namespaces that may be created on the single physical namespace is 4. That is, given that each bit can have a value of either 0 or 1, the 2 bits can be used to generate 4 different combinations of bit values. To continue with the foregoing example where the number of most significant pid bits is 2, a total of 4 virtual namespaces may be created, where each virtual namespace may be defined according to the respective values of the significant bits, thus, Space 0(00), Space 1(01), Space 2(10), and Space 3(11). All of the virtual namespaces may reside on a single physical namespace.

Following is a comparison of Lookup Keys Lk, expressed as a function, where only a single physical namespace is employed, and Lookup Keys Lk', expressed as a different function. Particularly, where only a single physical namespace is employed, lookup keys that may be employed to locate files may take the respective forms, for example, Lk1=fn (pid1, cid1), and Lk2=fn (pid2, cid1). As these examples indicate, the lookup keys Lk are a function only of the pid and cid. On the other hand, lookup keys Lk' employed to locate files in a virtual namespace according to some embodiments may take a different form. That is, in this illustrative example, a lookup key Lk' may take the forms, respectively, Lk'1=fn (space1, pid1, cid1), and Lk'2=fn (space1, pid2, cid1). Put another way, the lookup keys Lk' may be a function, at least in part, of a space number of a corresponding virtual namespace. This is shown graphically in FIG. 2A, where a space selector 200 may use file handles 202, such as Fh1 and Fh2 for example, to generate modified file handles 204, such as Fh1_space1 and Fh2_space2, that may be a function, at least in part, of a virtual namespace, that is, space1 and space 2, respectively.

FIG. 2B further indicates, in an example grouping 250 of virtual namespaces, that a lookup key may be moved from one virtual namespace to another virtual namespace, and both the first virtual namespace and the target virtual namespace may be on the same physical namespace. Particularly, the lookup keys Lk1 and Lk2 may be moved from a relatively sparse virtual namespace 252 to a less sparse virtual namespace 254. In one example, a sparse namespace may be in a range of only about 1 percent to about 10 percent full. As indicated in FIG. 2B, the full key contents do not change, even though the lookup keys Lk1 and Lk2 have been moved and are now redesignated Lk1' and Lk2' to reflect the new virtual namespaces where they are respectively located. Because the full key contents have not changed, the lookup keys still point to the same physical namespace. As such, there is no need to offline a file system to copy namespaces and delete old namespaces. Because the filesystem may remain online when the lookup keys are moved, backup and replication processes may continue to run without interruption during the move of the lookup keys.

Directing attention now to FIG. 3, and with the discussion of FIGS. 2A and 2B in view, it can be seen that a single physical namespace 300 may comprise multiple virtual namespaces may 302. In the particular example of FIG. 3, there are 4 virtual namespaces, namely, SP1: Virtual Namespace 1, SP2: Virtual Namespace 2, SP3: Virtual Namespace 3, and SP4: Virtual Namespace 4.

B. ASPECTS OF SOME EXAMPLE USE CASES

Embodiments of the invention may be employed in various ways. Accordingly, attention is directed now to some example use cases for some embodiments. These use cases are provided by way of illustration, and are not intended to limit the scope of the invention in any way.

B.1 Fast Copy

In general, fast copy, also referred to as 'fastcopy,' may comprise a process just copying the metadata of a namespace Btree into a new namespace Btree, that is, create a new namespace. The following discussion will consider this use case with, and without, the implementation and use of virtual namespaces.

Performance of a fast copy process without the use of virtual namespaces may involve various processes. These process may comprise: 1—copy all <key, value> pairs from one namespace to another namespace; 2—offline the file system; 3—change customer workflow to new namespace; 4—delete old namespace; and, 5—online the file system.

On the other hand, performance of a fast copy process using virtual namespaces as defined, implemented, and used, in some example embodiments may enable creation and use of a new namespace, the relocation of all keys from the old namespace to the new namespace, and may be implemented without requiring offlining and onlining of the file system. Particularly, some example embodiments may comprise the following processes: 1—select a target virtual namespace, which may be performed using ML/AI modelling; 2—copy all <key, value> pairs, that is, <lookup key, full key> pairs, from source virtual name space to target virtual namespace within the same physical namespace. No files system restarts are required in connection with the performance of 1 and 2, which may result in maintenance of, and or improvement in, availability of the file system to customers. Moreover, no changes are needed to customer workflows since the target virtual namespace is on the same physical namespace as the originating virtual namespace from which the <key, value> pairs were copied.

B.2 Compaction

Another example use case for some embodiments of the invention concerns compaction. In general, compaction comprises a process by which sparse pages and/or free empty pages are combined to shrink the Btree footprint, and thus improve performance improve performance of operations such as read and write operations. Various thresholds may be employed to determine if a particular page is a good candidate for compaction.

Some embodiments of the invention may be employed for compaction as follows. In some embodiments, all <key, value> pairs, such as <Lk1, Fk1> and <Lk2, Fk2>, may be moved from a sparse virtual namespace 252 (as shown on the left hand side of 250 in FIG. 2B) to another non-sparse virtual namespace 254 (as shown on the right hand side of 250 in FIG. 2B) within the same physical namespace 250. In some embodiments, the selection of a non-sparse virtual namespace for relocation, also referred to simply as a target virtual namespace, may be determined by two factors, namely, the current space usage in the target virtual namespace, and predicted growth of space usage in the target virtual namespace. The predicted growth of space usage may be determined, for example, based on ML (Machine Learning) modeling, as discussed in more detail elsewhere herein.

Movement of <key, value> pairs from a sparse virtual namespace to a non-sparse virtual namespace may be beneficial. For example, this approach may reduces the footprint of the physical Btree where the <key, value> pairs are stored, and may thus improve performance since only part of the Btree, or a smaller Btree, may need to be traversed to serve read and write operations. As well, relocation of entries, that is, <key, value> pairs, such as may result in a smaller Btree footprint may obviate many of the secondary problems faced by customers, such as excessively long execution times for fastcopy operations.

B.3 Staging Directories

Yet another example use case for some embodiments of the invention concerns the use of staging directories, such as in backup operations for example. In general, a standard file backup model is to ingest files to a temporary directory, sometimes referred to as a staging directory, on the backup server. In some embodiments, the backup server may comprise an EMC DataDomain Restorer (DDR), but that is not required. Once the file ingest is complete, the file may then be moved from the staging directory to its final destination, and the backup catalog is then updated.

Customer workloads encountered in current environments may involve a large number of files, which are often relatively small in size, that reside in one directory and are later moved to a new directory. Movement of the files to a staging directory, in current file systems such as the EMC DataDomain FileSystem (DDFS) directory implementations, may lead to creation of numerous dead entries, such as dead hashes and dirents for example, after the files have been moved to the target destination. Thus, for example, the number of active and useful namespace entries may be significantly outnumbered by the number of dead entries. This circumstance may lead to performance problems in the staging directory in the form of slow lookups, which may degrade the performance of the system. The following discussion will consider this use case with, and without, the implementation and use of virtual namespaces.

Absent the use of virtual namespaces provided by example embodiments of the invention, a path name lookup, such as in response to a read or write operation, would require the system to walk through both the live and dead entries in the namespace. Thus, the lookup time may be substantial and, correspondingly, the system performance may be significantly degraded.

On the other hand, significantly improved system performance may be achieved through the use of the disclosed virtual namespaces. For example, embodiments of the invention may relocate only active entries to a differential virtual namespace. Since only the active entries may be moved, fast lookups may be enabled, thereby improving system performance. That is, the lookups may be relatively fast since only active entries, and not the dead entries, would have to be searched. The virtual namespace to which the active entries are moved may be selected based on various criteria including, but not limited to, current space usage in the virtual namespace, and/or predicted growth in space usage and/or the predicted sparseness of one or more of the virtual namespaces. This growth may be determined based on ML modeling, for example.

B.4 Machine Learning/Artificial Intelligence

In various example embodiments, identification of a target virtual namespace to which one or more <key, value> pairs may be copied or moved may be made based on various criteria, including the amount of space that has already been consumed in a potential target virtual namespace, as well as the predicted grown in the usage of that space. The consumption rate of space and/or the predicted growth in the usage of space may be determined in whole or in part using ML and/or AI techniques, examples of which are discussed below.

This section will provide further details concerning virtual namespace selection, such as may occur in a directory relocation process, using a staging directory as an example use case. In some cases, relocation of a directory may be based on various factors including, but not limited to, read latency/number of pages loaded per lookup, and system load factors. This 2-factor model may give rise to 4 different possibilities, or choices, namely: 1—high read latency, high system load; 2—low read latency, high system load; 3—low read latency, low system load; and, 4—high read latency, low system load. In general, relocation may take place only when read latency is high and the system load is low since high latency in a low load situation may be indicative of a problem. That is, where the load is low, relatively low latency, not high latency, would be expected. Thus, in this example case, a files system directory may take place only for combination 4. The latency factor and the load factor may be used as input to an unsupervised AI learning model. Some example load factors may include CPU usage, and memory usage.

For example, some embodiments may employ an unsupervised learning process that employs K means clustering and/or other processes for automatic good/bad centroid detection, which may be platform agnostic. The centroid refers to a mean value of a particular data cluster. Using the 4 combinations of latency and system load, the data for those factors may be classified into 4 clusters, namely: Cluster 1—high read latency, high system load; Cluster 2—low read latency, high system load; Cluster 3—low read latency, low system load; and, Cluster 4—high read latency, low system load. Staging directories, which may fall into Cluster 4, may be good candidates for performance improvement through directory entries relocation.

Supervised learning processes may also be used to identify candidate directory entries for relocation. For example, classification models such as logistic regression, or neural networks, may be used to classify data points as good or bad candidates for relocation. Another example of a supervised learning process that may be employed in connection with some embodiments is a manual labeling process that may also be used to label data points, that is, directory entries, as good, or bad, candidates for relocation from a virtual namespace to a target virtual namespace.

With respect to relocation, one or more <key, value> pairs, or directory entries, may be relocated from a virtual namespace to a target virtual namespace by taking into consideration one or more performance characteristics of the target virtual namespace. To illustrate, one such consideration, which may be considered as a measure of efficiency, may be a Read latency/number of pages loaded per lookup in target space. In this example, relocation may take place to a target virtual namespace that has low read latency/number of pages loaded per lookup, that is, per read operation. As well, some embodiments may include monitoring a Read latency/number of pages loaded per lookup in the target virtual namespace after the relocation has taken place. If the Read latency/number of pages loaded per lookup in the target virtual namespace exceeds a certain threshold, which may vary from platform to platform, a different target virtual namespace may be used for subsequent relocations of <key, value> pairs, and/or the relocated <key, value> pairs may be relocated again to another target.

B.5 Example Experimental Results

With reference now to FIGS. 4a, 4b, and 4c, aspects of various results achieved with example embodiments of the invention are disclosed. The experimental setup included the following: create two virtual namespaces on top of a single physical name space; create a file and file handle in one virtual namespace; measure chmod (change permission) time (for example, t1); relocate the file handle to another virtual namespace; measure chmod (change permission) time (for example, t2).

Among other things, this experiment demonstrated that a file can be read using the relocated file handle. Thus, the relocation of the file handle from one virtual namespace to another virtual namespace had no effect on the ability to read the file, that is, the file was able to be read notwithstanding relocation of the file handle. The experiment further demonstrated that t1=t2, that is, there was no change in lookup cost, measured as time for example, for the relocated file handle. Thus, no performance penalty was imposed by use of relocated file handles.

Moreover, in at least some embodiments, relocation of a file handle may be completely transparent to a user. That is, a user or client may continue to issue, and have serviced, read and write operations notwithstanding any changes in the location of a file handle associated with a read or write request.

Further, as shown in FIG. 4a, the chmod time remains the same, regardless of file handle location, and regardless of the fact that the file handle was subjected to relocation process. FIG. 4b indicates the amount of time saved by avoiding a file system restart. Particularly, since the experiment simply relocated a file handle to different virtual namespace, instead of creating a new namespace with a file system restart, the time saved relative to the circumstance where a new namespace is created and requires a file system (FS) restart, is as follows: time saved=time taken for FS disable+time taken for FS enable. Results such as are indicated in FIGS. 4a and 4b may be captured in a log such as that shown in FIG. 4c.

C. EXAMPLE METHODS

Figure 5:
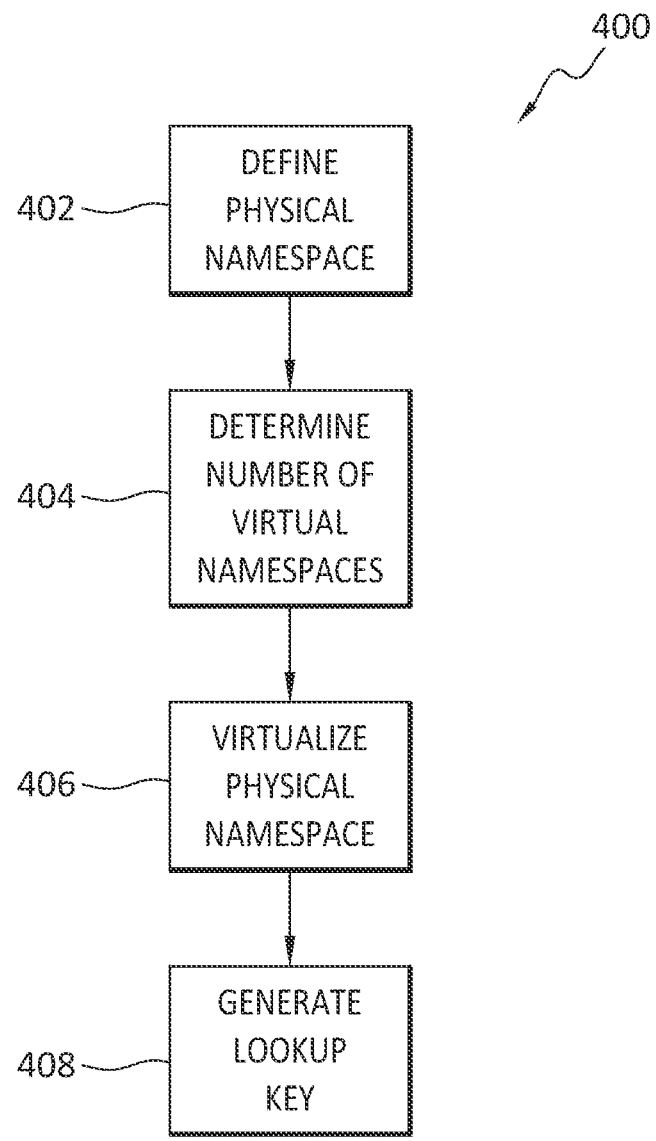
FIG. 5 discloses aspects of an example method for implementing multiple virtual namespaces on a single physical namespace.

It is noted with respect to the example method of FIG. 5 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 5, attention is directed to an example method 400. The method 400 may be performed by any suitable entity, or group of entities, examples of which include, but are not limited to, a memory manager, storage manager, backup application, or backup server.

The method 400 may begin when a physical namespace is defined 402. Definition of the physical namespace 402 may comprise, for example, allocating a portion of memory and/or storage for the storage of one or more <key, value> pairs. The allocation portion of memory or storage may be expressed in terms of a number of addressable locations on physical media where the <key, value> pairs may be stored. In some embodiments, the physical namespace may be implemented in the form of a data structure on physical computer readable media.

The method 400 may proceed to 404 where a number of virtual namespaces is specified and/or determined. The number of virtual namespaces specified 404 may be a function, for example, of a selected number of significant digits of a file handle expected to be stored in one of the virtual namespaces. In some embodiments, the file handle whose significant digits are employed to determine a number of virtual namespaces may already be stored in the physical namespace when the determination is made.

After a number of virtual namespaces has been determined, the physical namespace may be virtualized 406 by defining those virtual namespaces on the physical namespace. As a result, a single physical namespace may comprise one or more virtual namespaces.

Finally, a lookup key may be generated 408 that reflects that the file handle that includes the lookup key is stored in one of the virtual namespaces. For example, a value of the lookup key may be a function of a name of one of the virtual namespaces. An example form of a name of a virtual namespace may be 'space1' and one such lookup key may be expressed as fn(space1 pidx, cidy), where 'pid' refers to a parent id, and 'cid' refers to a child id, and 'x' and 'y' are positive whole integer values.

While not specifically indicated in FIG. 5, lookup keys may be moved from one virtual namespace to another, as disclosed in more detail elsewhere herein. Ongoing processes, such as backup and replication processes, involving files that correspond to the lookup keys may continue uninterrupted while lookup keys are being moved between virtual namespaces. Correspondingly, such movement of lookup keys does not require either the offlining and onlining of files systems to enable those movements.

E. FURTHER EXAMPLE EMBODIMENTS

Following are some further example embodiments of the invention. These are presented only by way of example and are not intended to limit the scope of the invention in any way.

Embodiment 1. A method, comprising: defining a physical namespace; determining a number of virtual namespaces; virtualizing the physical namespace by defining the virtual namespaces on the physical namespace; and generating a modified lookup key that is a function of a name of one of the virtual namespaces.

Embodiment 2. The method as recited in embodiment 1, wherein the lookup key is movable between two of the virtual namespaces without requiring interruption of an ongoing data backup process, or data restore process, that involves a file to which the modified lookup key corresponds.

Embodiment 3. The method as recited in any of embodiments 1-2, wherein the lookup key is movable between two of the virtual namespaces without requiring a file system offline, and the file system includes a file to which the lookup key refers.

Embodiment 4. The method as recited in any of embodiments 1-3, wherein the number of virtual namespaces is determined as a function of a number of significant digits of a parent id of a lookup key upon which the modified lookup key is based.

Embodiment 5. The method as recited in any of embodiments 1-4, wherein the modified lookup key maps to an associated full key in one of the virtual namespaces.

Embodiment 6. The method as recited in any of embodiments 1-5, wherein availability of a file to which the modified file key corresponds is unaffected my movement of the modified file key from one of the virtual namespaces to another of the virtual namespaces.

Embodiment 7. The method as recited in any of embodiments 1-6, wherein movement of the modified file key from one of the virtual namespaces to another of the virtual namespaces does not necessitate a change to a script for a process involving a file to which the modified file key corresponds.

Embodiment 8. The method as recited in any of embodiments 1-7, further comprising performing a fastcopy process comprising copying all <key, value> pairs from one of the virtual namespaces to a target virtual namespace of the virtual namespaces, and wherein the target virtual namespace is selected using an AI/ML process.

Embodiment 9. The method as recited in any of embodiments 1-7, further comprising performing a compaction process comprising copying all <key, value> pairs from a sparse one of the virtual namespaces to a non-sparse virtual namespace of the virtual namespaces, and wherein the non-sparse virtual namespace is selected based on current space usage in the non-sparse virtual namespace, and is also based on a predicted growth of space usage in the non-sparse virtual namespace.

Embodiment 10. The method as recited in any of embodiments 1-7, further comprising performing a process involving the use of a staging directory, and the process comprises relocating only active entries, and not dead entries, of one of the virtual namespaces to a target virtual namespace of the virtual namespaces, and wherein the target virtual namespace to which the active entries are moved is selected based on current space usage in the target virtual namespace, and is also based on a predicted growth of space usage in the target virtual namespace.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
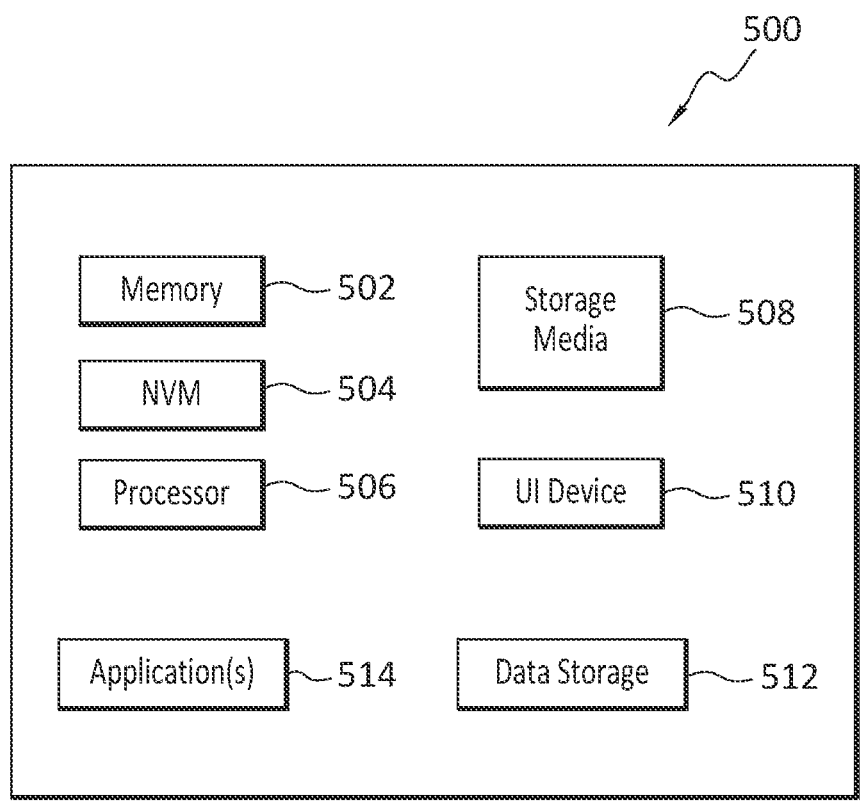
FIG. 6 discloses aspects of an example computing entity operable to perform any of the disclosed methods, processes, and operations.

With reference briefly now to FIG. 6, any one or more of the entities disclosed, or implied, by FIGS. 1-5 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 6.

In the example of FIG. 6, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
defining a physical namespace in a file system;
determining a number of virtual namespaces;
virtualizing the physical namespace by defining the virtual namespaces on the physical namespace;
generating a lookup key for each file saved in each virtual namespace based on a name of each virtual namespace and a full key of each file of the physical namespace, wherein the physical namespace maps the lookup key to the full key of each file saved in the physical namespace and the full key includes direction information and file name information in the file system;
when lookup keys in one virtual namespace are moved to another virtual namespace different from the one virtual namespace within the physical namespace, modifying the lookup keys of the one virtual namespace for the another virtual namespace based on a name of the another virtual namespace without requiring a restart of the file system, interruption of an ongoing data backup process, or data restore process; and
performing a compaction process comprising copying all key-value pairs <K, V> from a sparse one of the virtual namespaces to a non-sparse virtual namespace of the virtual namespaces,
wherein the non-sparse virtual namespace is selected based on current space usage in the non-sparse virtual namespace and a predicted growth of space usage in the non-sparse virtual namespace.

2. The method as recited in claim 1, wherein the number of virtual namespaces is determined as a function of a number of significant digits of a parent id of a full key upon which the modified lookup key is based.

3. The method as recited in claim 1, wherein the modified lookup key maps to an associated full key in one of the virtual namespaces.

4. The method as recited in claim 1, wherein availability of a file to which the modified lookup key corresponds is unaffected by movement of the modified lookup key from one of the virtual namespaces to another of the virtual namespaces.

5. The method as recited in claim 1, wherein movement of the modified lookup key from one of the virtual namespaces to another of the virtual namespaces does not necessitate a change to a script for a process involving a file to which the modified lookup key corresponds.

6. The method as recited in claim 1, further comprising performing a fastcopy process comprising copying all key-value pairs <K, V> from one of the virtual namespaces to a target virtual namespace of the virtual namespaces,
   wherein the target virtual namespace is selected using an artificial intelligence (AI)/machine learning (ML) process.

7. The method as recited in claim 1, further comprising performing a process involving the use of a temporary directory,
   wherein the process comprises relocating only active entries, and not dead entries, of one of the virtual namespaces to a target virtual namespace of the virtual namespaces, and
   wherein the target virtual namespace to which the active entries are moved is selected based on current space usage in the target virtual namespace and a predicted growth of space usage in the target virtual namespace.

8. A computer readable storage medium having stored therein instructions that are executable by one or more hardware processors to perform operations comprising:
   defining a physical namespace in a file system;
   determining a number of virtual namespaces;
   virtualizing the physical namespace by defining the virtual namespaces on the physical namespace;
   generating a lookup key for each file saved in each virtual namespace based on a name of each virtual namespace and a full key of each file of the physical namespace, wherein the physical namespace maps the lookup key to the full key of each file saved in the physical namespace and the full key includes direction information and file name information in the file system; and
   when lookup keys in one virtual namespace are to be moved to another virtual namespace different from the one virtual namespace within the physical namespace, modifying the lookup keys of the one virtual namespace for the another virtual namespace based on a name of the another virtual namespace without requiring a restart of the file system, interruption of an ongoing data backup process, or data restore process,
   wherein the operations further comprise performing a compaction process comprising copying all key-value pairs <K, V> from a sparse one of the virtual namespaces to a non-sparse virtual namespace of the virtual namespaces, and
   wherein the non-sparse virtual namespace is selected based on current space usage in the non-sparse virtual namespace, and a predicted growth of space usage in the non-sparse virtual namespace.

9. The computer readable storage medium as recited in claim 8, wherein the number of virtual namespaces is determined as a function of a number of significant digits of a parent id of a full key upon which the modified lookup key is based.

10. The computer readable storage medium as recited in claim 8, wherein the modified lookup key maps to an associated full key in one of the virtual namespaces.

11. The computer readable storage medium as recited in claim 8, wherein availability of a file to which the modified lookup key corresponds is unaffected by movement of the modified lookup key from one of the virtual namespaces to another of the virtual namespaces.

12. The computer readable storage medium as recited in claim 8, wherein movement of the modified lookup key from one of the virtual namespaces to another of the virtual namespaces does not necessitate a change to a script for a process involving a file to which the modified lookup key corresponds.

13. The computer readable storage medium as recited in claim 8, wherein the operations further comprise performing a fastcopy process comprising copying all key-value pairs <K, V> from one of the virtual namespaces to a target virtual namespace of the virtual namespaces, and wherein the target virtual namespace is selected using an artificial intelligence (AI)/machine learning (ML) process.

14. The computer readable storage medium as recited in claim 8, wherein the operations further comprise performing a process involving the use of a temporary directory,
   wherein the process comprises relocating only active entries, and not dead entries, of one of the virtual namespaces to a target virtual namespace of the virtual namespaces, and
   wherein the target virtual namespace to which the active entries are moved is selected based on current space usage in the target virtual namespace and a predicted growth of space usage in the target virtual namespace.

* * * * *